(12) United States Patent
Griggs et al.

(10) Patent No.: US 12,013,276 B2
(45) Date of Patent: Jun. 18, 2024

(54) FILTER PAN OIL LEVEL SENSOR

(71) Applicant: Giles Enterprises, Inc., Montgomery, AL (US)

(72) Inventors: Zachary Griggs, Decatur, GA (US); Lance Covert, Montgomery, AL (US); James Ward, Deatsville, AL (US)

(73) Assignee: Giles Enterprises, Inc., Montgomery, AL (US)

( * ) Notice: Subject to any disclaimer, the term of this patent is extended or adjusted under 35 U.S.C. 154(b) by 348 days.

(21) Appl. No.: 17/478,549

(22) Filed: Sep. 17, 2021

(65) Prior Publication Data

US 2022/0018700 A1 Jan. 20, 2022

Related U.S. Application Data

(63) Continuation of application No. PCT/US2020/023662, filed on Mar. 19, 2020.

(60) Provisional application No. 62/820,733, filed on Mar. 19, 2019.

(51) Int. Cl.
*G01F 23/00* (2022.01)
*A47J 37/12* (2006.01)
*G01F 23/20* (2006.01)

(52) U.S. Cl.
CPC .......... *G01F 23/20* (2013.01); *A47J 37/1266* (2013.01); *A47J 37/1276* (2013.01); *A47J 2203/00* (2013.01)

(58) Field of Classification Search
None
See application file for complete search history.

(56) References Cited

U.S. PATENT DOCUMENTS

| 5,297,142 | A | 3/1994 | Paggeot et al. |
| 5,617,777 | A | 4/1997 | Davis et al. |
| 5,776,530 | A * | 7/1998 | Davis ........... A47J 37/1223 99/330 |
| 6,009,794 | A | 1/2000 | Casey et al. |
| 6,254,790 | B1 | 7/2001 | King et al. |
| 8,689,679 | B2 | 4/2014 | Tiszai et al. |
| 2002/0174778 | A1* | 11/2002 | Petrusha ........... A47J 37/1266 99/344 |

(Continued)

FOREIGN PATENT DOCUMENTS

| EP | 2909293 | 8/2015 |
| JP | H0854933 | 2/1996 |

(Continued)

OTHER PUBLICATIONS

International Search Report and Written Opinion for International Application No. PCT/US2020/023662.

*Primary Examiner* — Brandi N Hopkins
*Assistant Examiner* — Nigel H Plumb
(74) *Attorney, Agent, or Firm* — Bradley Arant Boult Cummings LLP; Jacob W. Neu; Alex H. Huffstutter

(57) ABSTRACT

A sensor assembly for determining the level of oil in a filter pan may include a load cell for sensing the amount of oil in the filter pan. The filter pan may be pivotable about a first end of the filter pan within a frame. The assembly may also include a lever pivotable about a fulcrum. A first end of the lever may support a second end of the filter pan. A second end of the lever may press against the load cell based upon downward pressure from the filter pan against the first end of the lever.

20 Claims, 7 Drawing Sheets

(56) References Cited

U.S. PATENT DOCUMENTS

2011/0168282 A1* 7/2011 Mitropoulos ....... A47J 37/1271
                                                    137/565.01
2016/0109887 A1* 4/2016 Palazzo ............... A47J 37/1266
                                                    137/386

FOREIGN PATENT DOCUMENTS

| JP | H09203656 | * | 8/1997 | ............. G01G 21/16 |
| KR | 200354215 | | 6/2004 | |
| WO | 2003077721 | | 9/2003 | |
| WO | 2010020009 | | 2/2010 | |
| WO | WO-2010020009 A1 | * | 2/2010 | .......... A47J 37/1271 |

* cited by examiner

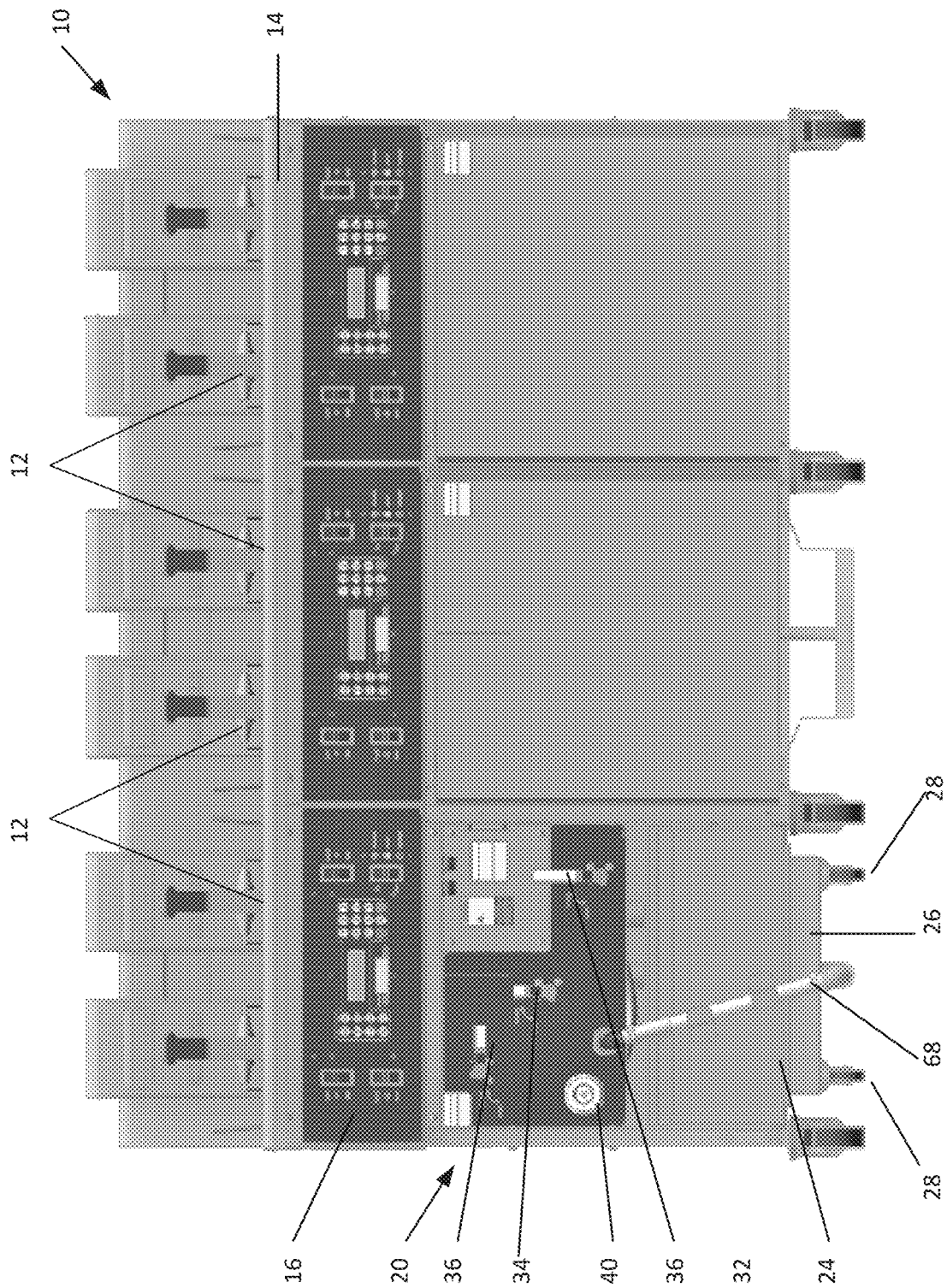

FILTER PAN OIL LEVEL SENSOR

This application claims the benefit of filing of U.S. Provisional Patent Application No. 62/820,733 filed on Mar. 19, 2019, which is incorporated herein by reference.

TECHNICAL FIELD

The apparatus disclosed herein is directed to the technical field of fryers for cooking food and related cooking apparatuses. More particularly, the invention is directed to an apparatus and method for determining the oil level in a filter pan.

BACKGROUND ART

Commercial cooking devices such as fryers that operate with cooking oil may have several frying or cooking bays that share a filtration system for cleaning and recirculating oil. Oil may only be filtered and recirculated a finite number of times before the oil quality is too degraded for further use. The oil may then be dumped to a filter pan for removal. In commercial cooking equipment, there is typically only one filter pan for several cooking or frying bays. Therefore, it is necessary to remove and dump the filter pan oil. This may cause two problems. First, the filter pan may be full of oil, such that when a user dumps oil from another bay, the filter pan overflows and causes oil to spill out. Second, the filter pan may not be properly replaced after the user has dumped the oil previously present. Once again, this may cause oil to spill out.

What is needed, then, is a sensor system for notifying the user when the oil filter pan is full or not present so that the user does not dump oil in a manner causing a spill.

SUMMARY OF THE INVENTION

In some respects the invention is directed to an apparatus for measuring an amount of oil present in a filter pan pivotable about a first end of the pan, wherein the apparatus has a fulcrum affixed to a frame and a load cell affixed to the frame, and a lever pivotable about the fulcrum, having a first end and a second end, wherein the first end of the lever supports a second end of the oil filter pan, and the second end of the lever urges against the load cell.

In other respects the invention is directed to a method for measuring an amount of oil in a filter pan having the steps of gathering the amount of oil in the filter pan such that the filter pan tilts downward on a first side; depressing a first end of a lever that engages the first side of the filter pan; urging a second end of the lever against a load cell to obtain a reading; and notifying a user the filter pan is full, based on the reading of the load cell.

BRIEF DESCRIPTION OF DRAWINGS

FIG. 1 depicts a cooking unit assembly and associated control assembly.

DESCRIPTION OF EMBODIMENTS

Figure 2A:
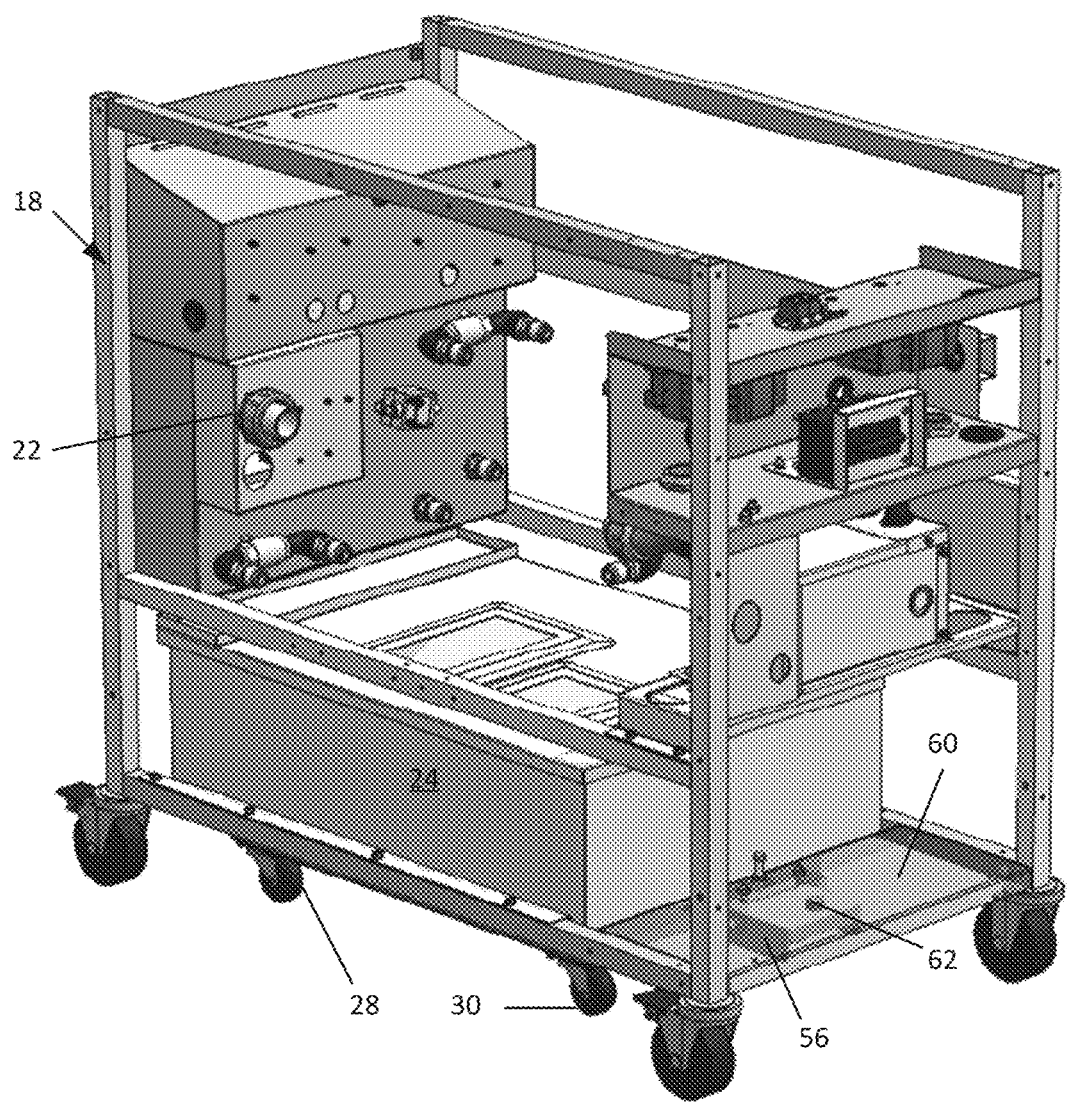
FIGS. 2A and 2B depict perspectives of a frame including a filter pan.

FIG. 1 depicts a front view of a cooking unit assembly 10 of fryers having a filter pan 24 and filtration assembly 20. Cooking units, including but not limited to fryers, often have oil filtration systems or assemblies for re-using cooking oil that could support an oil level sensor of the type described herein. Accordingly, the oil filter sensor mechanism as disclosed herein is not limited to fryers specifically or to cooking products generally. Nevertheless, for purposes of providing a specific utility environment, the apparatus is described with respect to fryers.

The assembly 10 has a frame 18. The frame 18 provides the frying basins that contain oil and also supports the fryers as wells as related electrical, mechanical, and fluid assemblies. As shown in FIG. 1, the frame 18 supports a bank of fryer baskets 12 suspended over basins maintained within a rack 14 mounted to the top of the frame 14. Other elements may be included for operating or ventilating the fryers, such as a control system 16 or a hood above the fryers (not shown). The frame 18 also supports a filtration assembly 20 as further described herein.

Figure 2B:
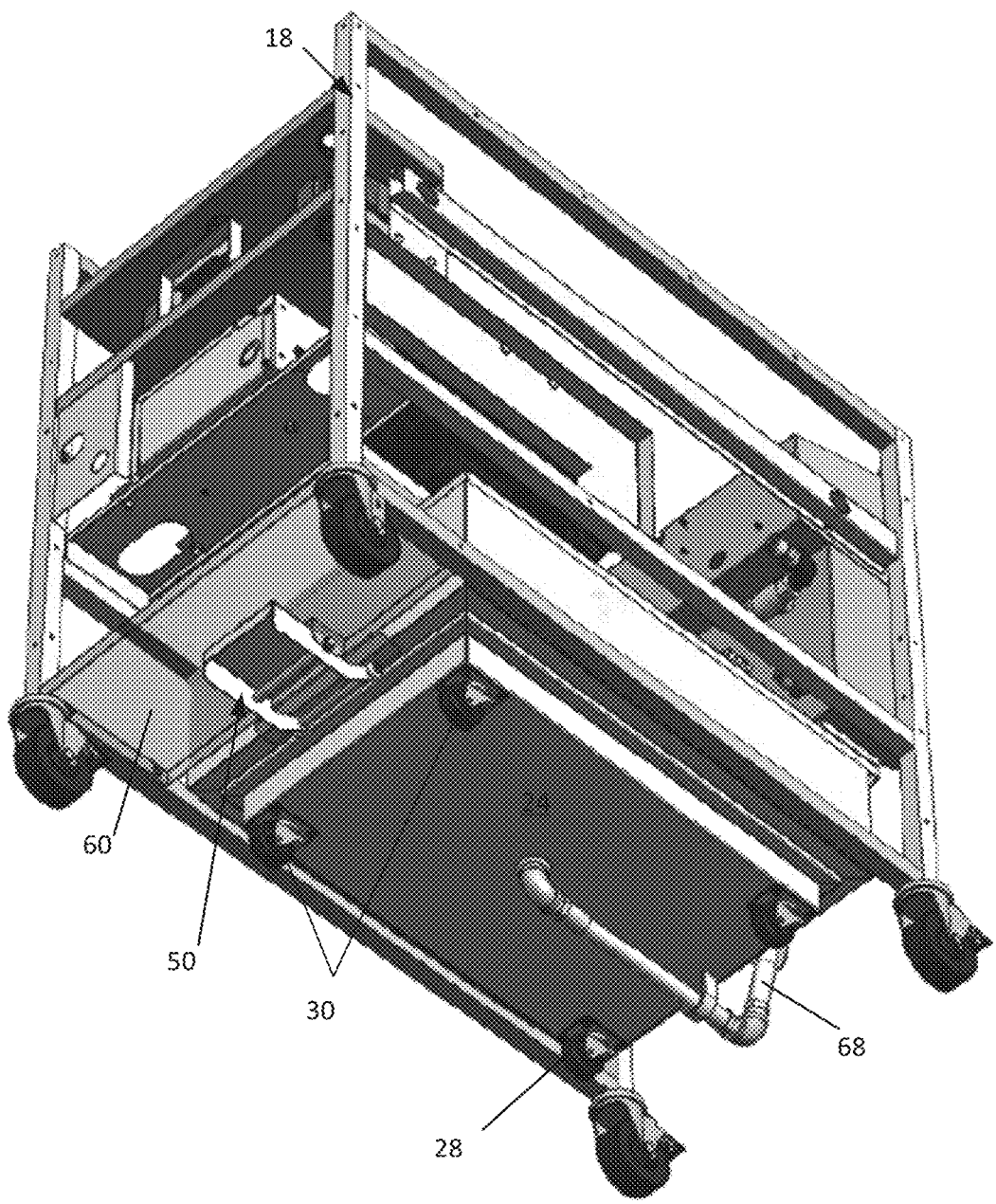

FIGS. 2A and 2B show different perspectives of an embodiment of the frame 18 with the various electrical wires and fluid hoses removed for ease of viewing. The frame 18 as depicted in FIGS. 2A and 2B is mounted on casters for ease in moving the cooking unit assembly 10 to a desired location. A filter pump 22 is provided for pumping the oil through the filtration assembly. A filter pan 24 is shown at the bottom of the frame 18. In the embodiment shown in FIGS. 2A and 2B, the filter pan 24 is set on its own front casters 28 and rear casters 30. To the rear of the filter pan 24 is a brace 60, below which is the sensor assembly 50 as described more fully herein.

Figure 3:
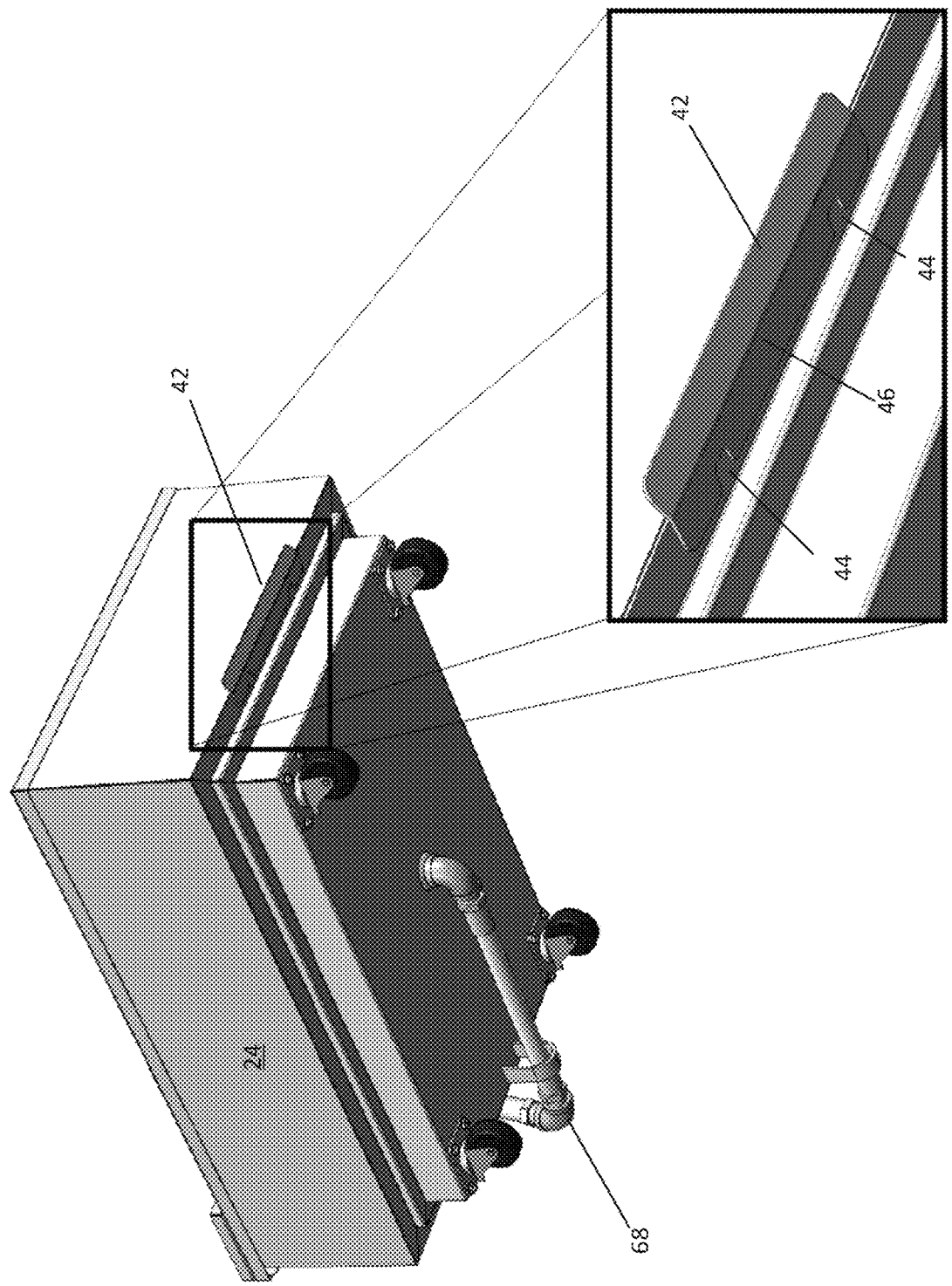
FIG. 3 depicts a perspective view of a filter pan with an inset view of a shoe attached to the filter pan.

FIG. 3 depicts the filter pan 24 in isolation. The filter pan 24 in this embodiment is in the shape of a large box with high walls, appearing more like a rectangular basin. The pan 24 may have other configurations, such as being wide and flat, or other shapes, as may be desired for accommodating a frame or cooking unit assembly configuration.

The filter pan 24 in the embodiment of FIG. 3 is shown supported by a filter pan base 26 resting on casters. The front casters 28 are located to the front of the cooking assembly (that is, the portion of the assembly 10 facing a person who is frying food or adjusting the controls shown in FIG. 1). The rear casters 30 are located towards the back of the assembly 10, where the brace 60 is shown in FIGS. 2A and 2B. In other embodiments, legs may be provided instead of casters. Alternatively, more or fewer casters may be used than the four shown. In still other embodiments, the filter pan 24 may be attached directly to the frame 18, for example, by an axle passing through the front end of the filter pan 24 that is mounted to the frame 10 so that the filter pan 24 can tilt in the manner further described below.

Figure 4A:
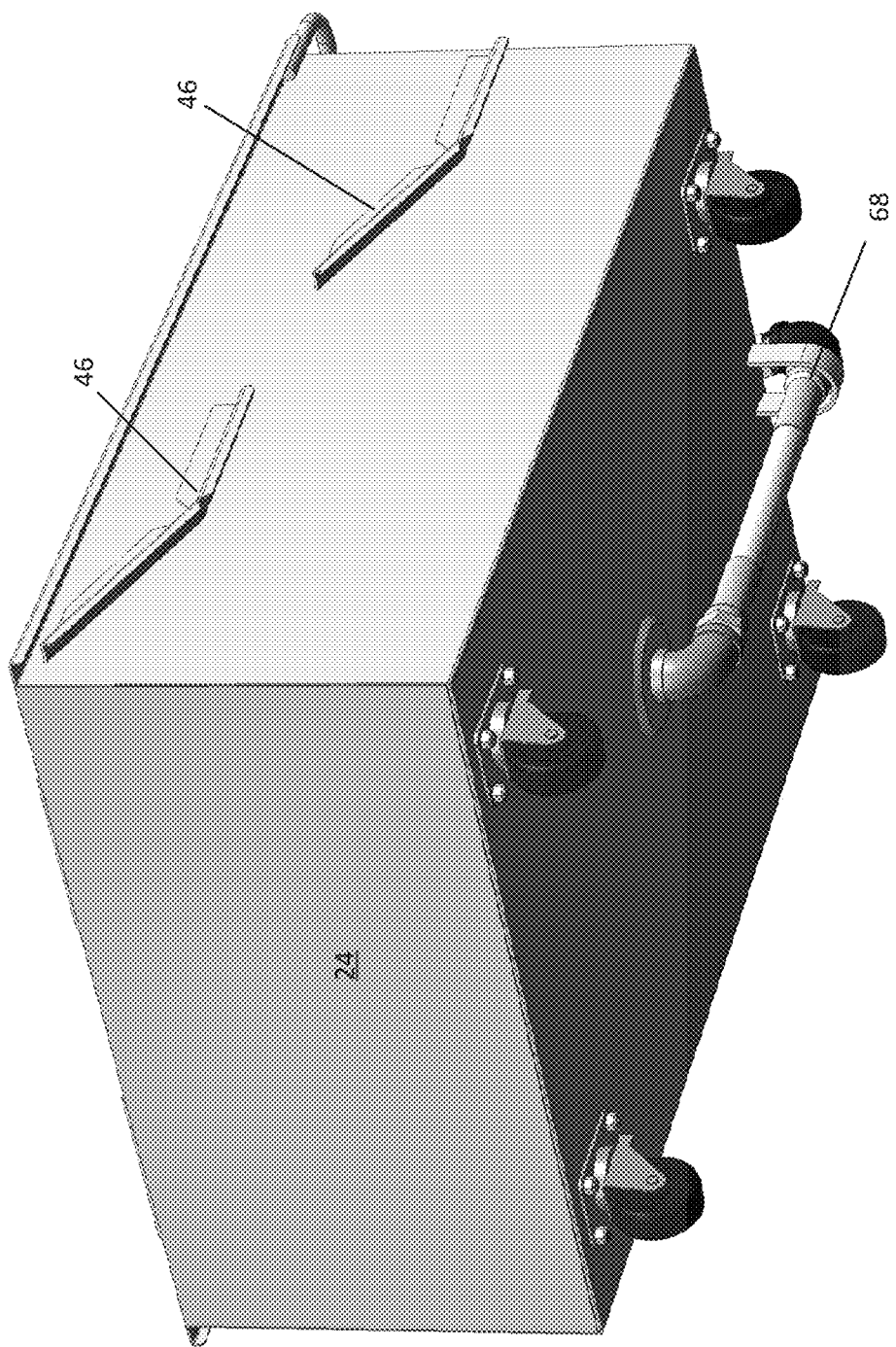
FIGS. 4A and 4B depict an alternative embodiment of a filter pan and frame.
Figure 4B:
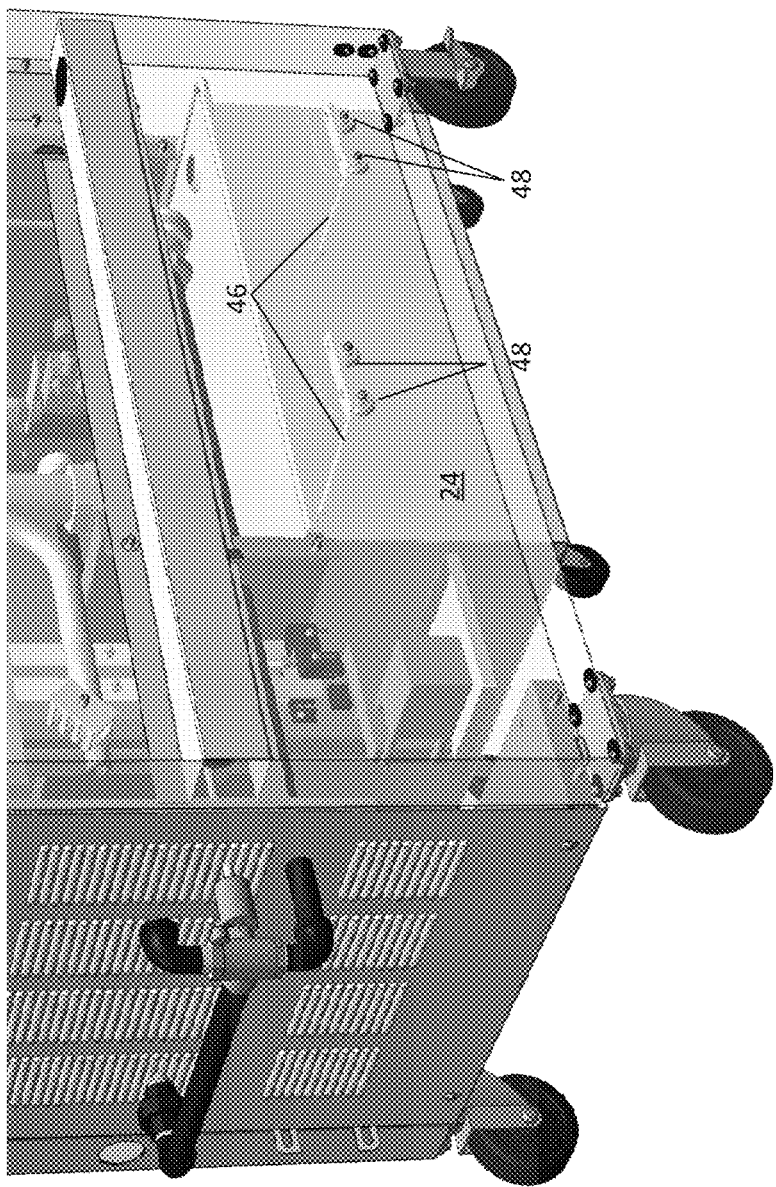

FIGS. 4A and 4B depict an alternative embodiment wherein the filter pan 24 has one or more tracks 46 on the exterior sides of the filter pan 24, and the frame 10 has one or more corresponding sets of casters 48 positioned to roll along the underside or engage into the tracks 24. This allows the filter pan 24 to be lifted off the ground and be supported by the frame 10. This allows the frame and filter pan to be moved across the floor as a single integrated unit rather than as separate rolling units.

Returning to FIG. 1, there is depicted a typical control panel and configuration for the filtration assembly 20. The elements described herein concerning the control panel and valves, hoses, and pumps may or may not appear in the same manner or the same configuration in each specific assembly, based on the particular design set up for a given application.

Using the configuration depicted in FIG. 1, the process of cycling the cooking oil proceeds as follows. When the discharge valve 38 is turned to permit oil flow as shown in FIG. 1. If it is instead directed towards discharge, then the cooking oil will flow towards the discharge hose coupling 40, to which a discharge hose (not shown) is connected, in order to remove the cooking oil complete for disposal. New oil would then be added to the cooking basin. With the discharge valve 38 directed towards "oil return," the drain valve 34 is then opened. This drains the oil in the cooking basin to the filter pan 24. The interior of the filter pan 24 includes filter paper for filtering oil prior to be being recycled for use. The filter pan 24 may be removable from the frame 18 for cleaning the interior basin of the pan.

While the valves depicted in FIG. 1 and described above are shown as manual valves, in other embodiments the valves may be automatically controlled in connection with the control panel and processor, for example, by using a motorized valve or solenoid.

The filter pan 24 has a filter hose 68 coupled to the bottom of the filter pan for draining the filter pan when opened. The filter hose 68 proceeds along the underside of the filter pan 24 toward the front of the filter pan, as shown in FIG. 3, and then extends upward to the main panel for the filtration assembly, as shown in FIG. 1. The filter hose 68 connects to the filter hose 68 coupling 32. When the return valve 36 is opened, the oil may be pumped back to the cooking basin by the filter pump 22. The pump 22 may operate automatically once the return valve 36 is opened, or the pump 22 may be operated separately, such as by pressing a button. In some embodiments, the return valve 36 and pump 22 may be operated in combination by pressing a single button on the control panel that indicates to return oil to the cooking basin.

The oil filter pan is often only large enough to hold oil from one cooking basin, and therefore, the need arises to ensure that the filter pan is thoroughly emptied before oil in another basin is filtered. In addition, if the filter pan is removed to be cleaned, the user must ensure that the pan is replaced. Otherwise, opening the drain valve 38 will cause oil to be drained onto the floor.

Figure 5:
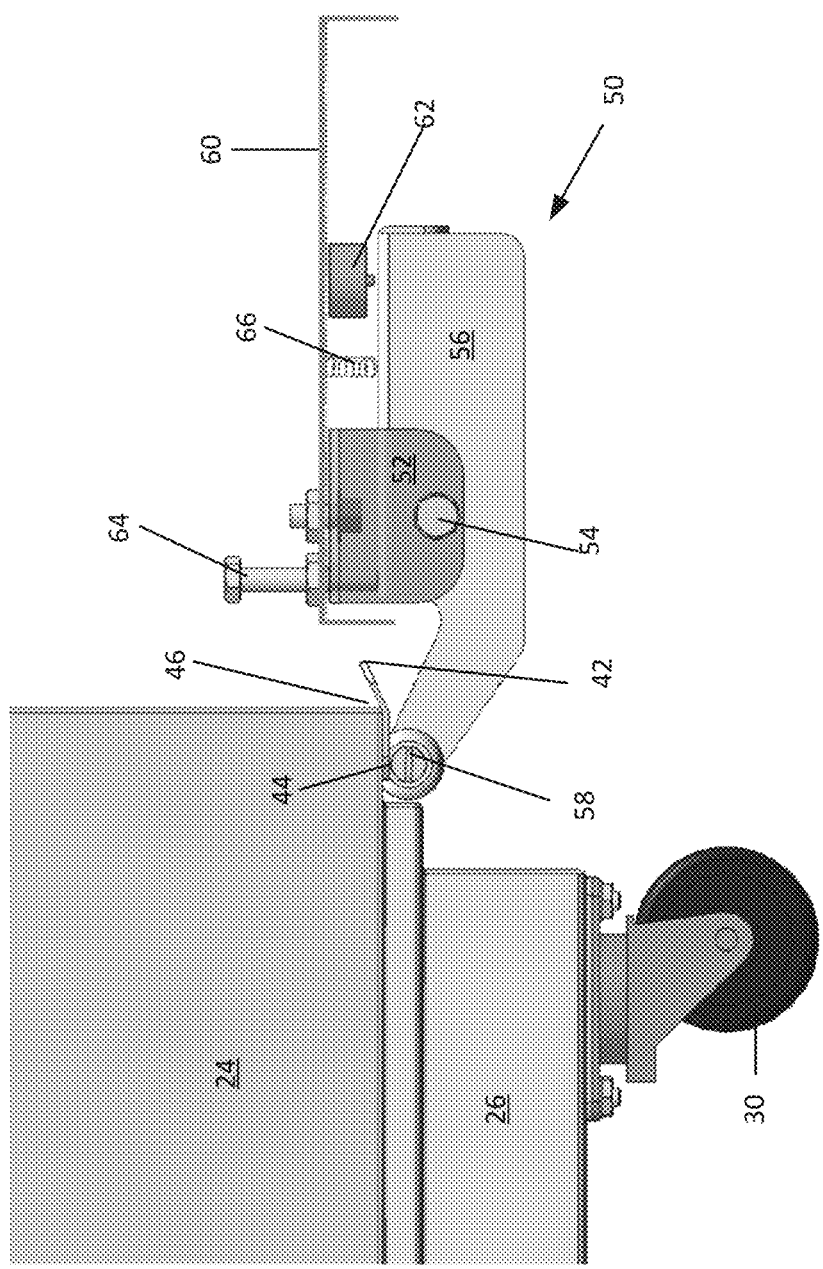
FIG. 5 depicts a profile view of a load cell and assembly.

To address these issues, a sensor is provided to determine the presence of the pan and the amount of oil in the pan. FIG. 5 depicts an embodiment of a sensor assembly 50. A load cell 62 is mounted to the underside of the brace 60. The brace is shown in profile in FIG. 5 but seen more clearly in FIGS. 2A and 2B. Between the load cell 50 and the filter pan 24 a bracket 52 is also attached to the underside of the brace 60. The bracket 52 has a fulcrum 54, about which an attached lever 56 rotates. One end of the lever 56 extends underneath and contacts the load cell 62. The other end of the lever 56 is attached to a roller 58. The roller 58 is positioned underneath or alongside the filter pan 24. In other embodiments, the roller may be replaced by a bumper or plastic glide. In still other embodiments, the lever may engage the filter pan directly.

The filter pan 24 is configured such that when it is empty, the back end of the filter pan 24 is supported by the roller 58. If the filter pan 24 has a support base 26 or rear casters 30, these are elevated slightly off the ground, such that the weight of the filter pan 24 is supported by the roller 58 and lever 56. The application of the filter pan's weight on that end of the lever 56 causes the other end of the lever to press against the load cell 62. Ultimately, the force of the weight of the filter pan 24 is transferred through the lever 56 and load cell 62 onto the frame 18. The load cell 62 determines that a force is being applied to it and registers to the central processing unit the reading of the force. This information may displayed or communicated back to the user in a number of ways, such as by a display showing the weight of the pan 24, or a light indicating that the filter pan 24 is in place. In addition, the drain valve 34 could be restricted from opening under certain conditions. For example, if the load cell 62 does not return a reading indicating that the filter pan 24 is in place, the drain valve 34 could be locked in place. Alternatively, if the load cell 62 indicated that the filter pan 24 was full or otherwise had a volume or weight of oil above a defined threshold, the drain valve 34 could be locked in place. In these instances wherein the load cell returns a condition that would necessitate keeping the drain valve 34 closed, the valve could remain closed by a number of mechanisms. For example, an electromagnet (not shown) could be activated that holds the ball of the drain valve 34 in a locked position until the triggering condition is resolved. Alternatively, a motorized valve or electric solenoid could be used to govern the opening or closing of the drain valve or other valves 34. Other mechanisms known in the art for restricting the drain valve 34 could also be used.

As set forth above, the front end of the filter pan 24 is fixed. Thus, as the filter pan 24 fills with oil, the rear end will depress slightly onto the roller 58 and lever 56, causing the oil to gather towards the rear of the pan 24. This directs the weight of the oil onto the rear end of the filter pan 24, thereby causing an increased force to be transferred through the lever 56 to the load cell 62. The load cell 62 determines the weight of the oil and transmits this data to the central processing unit of the control panel. Again, this information can then be communicated to the user, such as by a display showing the increased weight of the filter pan 24, or a light or other device indicating the weight or fullness of the pan 24. In some embodiments, when the load cell 62 reading indicates that the pan 24 is full of oil, it may lock the user from turning another drain valve connected to a different cooking basin in order to prevent filter pan 24 from overflowing, such as by the mechanisms described above.

FIG. 5 also depicts a shoe 42 attached to the lower read edge of the filter pan 24. The shoe 42 provides a surface for the end of the lever 56 or the roller 58 to engage on the filter pan 24 and provide additional surface area to reduce the chance of the filter pan 24 slipping off the lever 56 or roller 58. The angled shoe 42 also provides a slight misalignment between the filter pan 24 and the roller 58, such that the shoe 42 will engage the rollers 58 even if the filter pan 24 is not perfectly aligned with the rollers 58 when it is inserted into place. The shoe 42 is also depicted in FIGS. 2A and 2B. As shown therein, the shoe 42 may further include cut-outs 44 such that the roller 58 or lever 56 lodges in the cut-outs as the filter pan 24 tilts downward, thereby further reducing the chance of slippage. The shoe 42 may also extend beyond the edge of the filter pan 24, as shown, and may have a bended profile to further support the filter pan 24 should it slip forward a short distance.

FIG. 5 also depicts an adjustment screw 64 for positioning the roller 58 or lever 56 end underneath the filter pan 24 In the configuration shown with the adjustment screw 64 on the same side of the fulcrum 54 as the filter pan 24, tightening the screw would cause the roller 58 to adjust downward, while loosening the adjustment screw 64 would adjust the roller 58 upward.

FIG. 5 also depicts a spring 66 provided to help balance the weight of the lever 56 and roller 58 and to keep the lever pressed against the adjustment screw 64. The spring could 66 could also be on the opposite side of the fulcrum 54 and be in a tensile state rather than a compressive state.

The filter pan oil level sensor provided herein has several advantages over the prior art. First, it avoids the need for a sensor to be placed in the oil itself, which will eventually become covered in unfiltered used oil and need to be replaced. Second, the cantilevered design removes the load cell from being directly underneath the filter pan. This eases the user's ability to remove and clean the pan and reduces the amount of weight directed on the load cell. It also places the load cell in a more protected location to prevent damage to the load cell.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

We claim:

1. An apparatus for measuring an amount of oil present in a filter pan, comprising:
    the oil filter pan pivotable about a first end of the oil filter pan;
    a fulcrum affixed to a frame;
    a load cell affixed to the frame and offset from a second end of the oil filter pan away from the first end of the oil filter pan; and
    a lever pivotable about the fulcrum and having a first end and a second end, wherein the first end of the lever supports the second end of the oil filter pan, and the second end of the lever urges against the load cell.

2. The apparatus of claim 1, wherein the first end of the oil filter pan is affixed to the frame.

3. The apparatus of claim 1, further comprising a filter pan support supporting the first end of the oil filter pan.

4. The apparatus of claim 1, further comprising a shoe attached to the second end of the oil filter pan where the first end of the lever contacts the oil filter pan.

5. The apparatus of claim 4, wherein the shoe contains a cutout.

6. The apparatus of claim 1, further comprising a roller attached to the first end of the lever.

7. The apparatus of claim 6, further comprising a shoe attached to the second end of the oil filter pan where the roller contacts the oil filter pan.

8. The apparatus of claim 7, wherein the shoe contains a cutout.

9. The apparatus of claim 1 further comprising a spring biasing the second end of the lever away from the load cell.

10. The apparatus of claim 1, wherein the second end of the lever extends away from the filter pan.

11. The apparatus of claim 1, wherein the fulcrum is laterally offset from the filter pan.

12. The apparatus of claim 1, wherein the load cell coupled to an underside of the frame.

13. The apparatus of claim 1, further comprising a brace coupled to the frame, wherein the load cell is affixed to an underside of the brace.

14. The apparatus of claim 1, further comprising a spring configured to engage the second end of the lever between the fulcrum and the load cell.

15. The apparatus of claim 1, wherein the oil filter pan is removable attached to the frame.

16. A method for measuring an amount of oil in a filter pan comprising:
    gathering the amount of oil in the filter pan such that the filter pan tilts downward on a first side;
    depressing a first end of a lever that engages the first side of the filter pan;
    urging a second end of the lever against a load cell to obtain a reading, the second end of the lever extending away from the filter pan; and
    notifying a user the filter pan is full, based on the reading of the load cell.

17. The method of claim 16, wherein the load cell is laterally offset from the filter pan.

18. The method of claim 16, wherein the second end of the lever is urged upward against the load cell.

19. The method of claim 16, further comprising biasing the second end of the lever away from the load cell using a spring.

20. The method of claim 16, further comprising pivoting the lever about a fulcrum laterally offset from the filter pan.

* * * * *